(12) United States Patent
Bogdan, Jr. et al.

(10) Patent No.: US 10,500,832 B2
(45) Date of Patent: Dec. 10, 2019

(54) SYSTEMS AND METHODS FOR ADDITIVE MANUFACTURING ROTATING BUILD PLATFORMS

(71) Applicant: General Electric Company, Schenectady, NY (US)

(72) Inventors: David Charles Bogdan, Jr., Charlton, NY (US); Jason Harris Karp, Niskayuna, NY (US); Justin John Gambone, Jr., Watervliet, NY (US); Lang Yuan, Niskayuna, NY (US); Jinjie Shi, Clifton Park, NY (US); Victor Petrovich Ostroverkhov, Ballston Lake, NY (US); Marshall Gordon Jones, Scotia, NY (US); William Thomas Carter, Galway, NY (US); Harry Kirk Mathews, Jr., Clifton Park, NY (US); Kevin George Harding, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 290 days.

(21) Appl. No.: 15/408,843

(22) Filed: Jan. 18, 2017

(65) Prior Publication Data

US 2018/0200963 A1    Jul. 19, 2018

(51) Int. Cl.
*B33Y 30/00* (2015.01)
*B33Y 10/00* (2015.01)
(Continued)

(52) U.S. Cl.
CPC ............... *B33Y 30/00* (2014.12); *B33Y 10/00* (2014.12)

(58) Field of Classification Search
CPC ....... B22F 3/1055; B33Y 10/00; B33Y 50/02; B29C 64/364; B29C 64/245; B29C 64/153; B29C 64/44
See application file for complete search history.

(56) References Cited

U.S. PATENT DOCUMENTS 8,956,144 B2    2/2015    Grasegger et al.
9,321,215 B2    4/2016    Dudley
(Continued)

FOREIGN PATENT DOCUMENTS

JP    5960330 B1    8/2016
JP    6026698 B1    11/2016

OTHER PUBLICATIONS

International Search Report and Written Opinion issued in connection with corresponding PCT Application No. PCT/US2017/067469 dated Apr. 13, 2018,10 Pages.

*Primary Examiner* — Timothy Kennedy
*Assistant Examiner* — Debjani Roy
(74) *Attorney, Agent, or Firm* — Armstrong Teasdale LLP

(57) ABSTRACT

An additive manufacturing system is configured to manufacture a component. The additive manufacturing system includes a laser device, a build platform, a first scanning device, and an air knife. The laser device is configured to generate a laser beam. The component is disposed on the build platform. The air knife is configured to channel an inert gas across the build platform. The first scanning device is configured to selectively direct the laser beam across the build platform. The laser beam is configured to generate successive layers of a melted powdered build material on the component and the build platform. The build platform is configured to rotate the component relative to the air knife.

17 Claims, 3 Drawing Sheets

(51) Int. Cl.
   *B29C 64/153*   (2017.01)
   *B29C 64/245*   (2017.01)
   *B29C 64/364*   (2017.01)
   *B33Y 50/02*    (2015.01)

(56) References Cited

U.S. PATENT DOCUMENTS

| | | |
|---|---|---|
| 9,403,235 B2 | 8/2016 | Buller et al. |
| 9,423,756 B2 | 8/2016 | Hanson et al. |
| 10,286,484 B1 * | 5/2019 | McCarthy ............ B23K 26/042 |
| 2006/0108712 A1 * | 5/2006 | Mattes .................. B22F 3/004 |
| | | 264/308 |
| 2009/0179355 A1 * | 7/2009 | Wicker ................ B33Y 30/00 |
| | | 264/401 |
| 2013/0186514 A1 | 7/2013 | Zhuang et al. |
| 2015/0102531 A1 | 4/2015 | El-Siblani et al. |
| 2015/0251360 A1 | 9/2015 | Steele |
| 2015/0273631 A1 | 10/2015 | Kenney et al. |
| 2015/0306819 A1 | 10/2015 | Ljungblad |
| 2015/0367416 A1 * | 12/2015 | Buller .................. B23K 26/346 |
| | | 419/53 |
| 2016/0016361 A1 | 1/2016 | Lobovsky et al. |
| 2016/0031010 A1 | 2/2016 | O'Neill et al. |
| 2016/0067923 A1 * | 3/2016 | James .................. B29C 64/153 |
| | | 264/497 |
| 2016/0136731 A1 | 5/2016 | McMurtry et al. |
| 2016/0144563 A1 | 5/2016 | Elliott |
| 2018/0161925 A1 * | 6/2018 | Harding ............ B23K 26/0643 |

* cited by examiner

SYSTEMS AND METHODS FOR ADDITIVE MANUFACTURING ROTATING BUILD PLATFORMS

BACKGROUND

The field of the disclosure relates generally to additive manufacturing systems, and more particularly, to systems and methods for rotating build platforms with a Direct Metal Laser Melting (DMLM) system.

At least some additive manufacturing systems involve the buildup of a powdered material to make a component. This method can produce complex components from powder materials at a reduced cost and with improved manufacturing efficiency. At least some known additive manufacturing systems, such as DMLM systems, fabricate components using a laser device, a build platform, a recoater, and a powder material, such as, without limitation, a powdered metal. The laser device generates a laser beam that melts the powder material on the build platform in and around the area where the laser beam is incident on the powder material, resulting in a melt pool. The build platform is lowered by some amount, for example, 10 to 100 microns and the recoater spreads additional powered build material over the prior layers. Additionally, the weld pool of some known DMLM systems generates smoke during the build process which interferes with the laser beam and the melt pool. As such, some known DMLM systems channel a flow of an inert gas across the melt pool during the build process to remove the smoke. If the components were all stationary, the flow of inert gas and the direction the recoater spreads the powdered build material would always be in the same direction. As such, the flow of inert gas and the recoater interferes with the melt pool and cause defects in the produced components. These defects are made worse or more common by spreading the powdered build material in the same direction for each layer of the build and by continually channeling a flow of inert gas in the same direction.

BRIEF DESCRIPTION

In one aspect, an additive manufacturing system is provided. The additive manufacturing system is configured to manufacture a component. The additive manufacturing system includes a laser device, a build platform, a first scanning device, and an air knife. The laser device is configured to generate a laser beam. The component is disposed on the build platform. The air knife is configured to channel a flow of inert gas across the build platform. The first scanning device is configured to selectively direct the laser beam across the build platform. The laser beam is configured to generate successive layers of a melted powdered build material on the component and the build platform. The build platform is configured to rotate the component relative to the air knife.

In another aspect, an additive manufacturing system is provided. The additive manufacturing system is configured to manufacture a component. The additive manufacturing system includes a laser device, a build platform, a recoater, and a first scanning device. The laser device is configured to generate a laser beam. The component is disposed on the build platform. The recoater is configured to coat a powdered build material on the component and the build platform. The first scanning device is configured to selectively direct the laser beam across the build platform. The laser beam is configured to generate successive layers of a melted powdered build material on the component and the build platform. The build platform and the recoater are all configured to independently rotate relative to each other.

In yet another aspect, a method of manufacturing a component with an additive manufacturing system is provided. The additive manufacturing system includes a laser device, a build platform, an air knife, and a recoater. The component is disposed on the build platform. The air knife is configured to channel a flow of inert gas across the build platform. The method includes spreading a powdered build material on the build platform and the component with the recoater. The method also includes generating a laser beam with the laser device. The laser beam is directed toward the powdered build material. The method further includes generating a melted powdered build material with the laser beam. The method also includes rotating the build platform relative to the air knife.

DRAWINGS

These and other features, aspects, and advantages of the present disclosure will become better understood when the following detailed description is read with reference to the accompanying drawings in which like characters represent like parts throughout the drawings, wherein.

Figure 1:
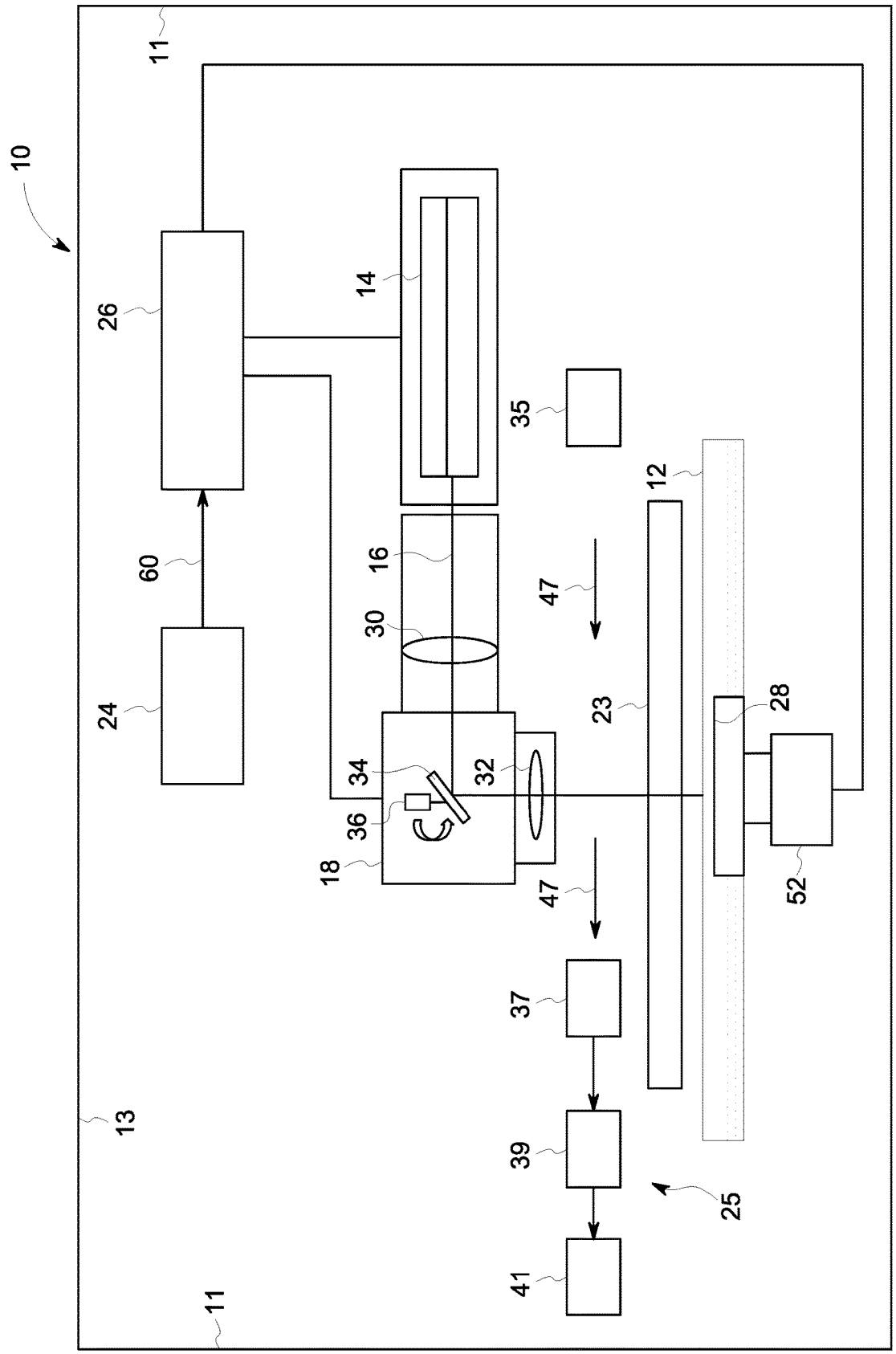
FIG. 1 is a schematic view of an exemplary additive manufacturing system shown in the form of a direct metal laser melting (DMLM) system including a build platform.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the additive manufacturing systems with a rotating build platform described herein rotate a build platform relative to an air knife. The additive manufacturing system includes a build platform, an air knife, a laser device, a recoater, and a plenum. The laser device generates a laser beam directed to a powdered build material on the build platform. The recoater spreads the powdered build material on the build platform. The air knife channels a flow of inert gas across the build platform in order to clear smoke generated by the build process away from the laser beam. The plenum channels the flow of inert gas and the smoke away from the laser beam and the build platform. The build platform rotates relative to the air knife and the recoater between each layer of powdered build material. Thus, the defects caused by the air knife and the recoater are directed in different directions for each layer and cancel each other out.

FIG. 1 is a schematic view of an exemplary additive manufacturing system 10 illustrated in the form of a direct metal laser melting (DMLM) system. Although the embodiments herein are described with reference to a DMLM system, this disclosure also applies to other types of additive manufacturing systems, such as selective laser sintering systems.

In the exemplary embodiment, DMLM system 10 includes a build platform 12, a laser device 14 configured to generate a laser beam 16, and a first scanning device 18 configured to selectively direct laser beam 16 across build platform 12. The exemplary DMLM system 10 also includes a recoater 23 configured to spread a powdered build material 21 across build platform 12 and an inert gas system 25 configured to channel a flow of inert gas across build platform 12. DMLM system 10 further includes a computing device 24 and a controller 26 configured to control one or more components of DMLM system 10, as described in more detail herein. A plurality of walls 11 define an air-locked build chamber 13. DMLM system 10 is disposed within air-locked build chamber 13.

Build platform 12 includes powdered build material 21 that is melted and re-solidified during the additive manufacturing process to build a solid component 28. Powdered build material 21 includes materials suitable for forming such components, including, without limitation, gas atomized alloys of cobalt, iron, aluminum, titanium, nickel, and combinations thereof. In other embodiments, powdered build material 21 includes any suitable type of powdered build material. In yet other embodiments, powdered build material 21 includes any suitable build material that enables DMLM system 10 to function as described, including, for example and without limitation, ceramic powders, metal-coated ceramic powders, and thermoset or thermoplastic resins.

Figure 2:
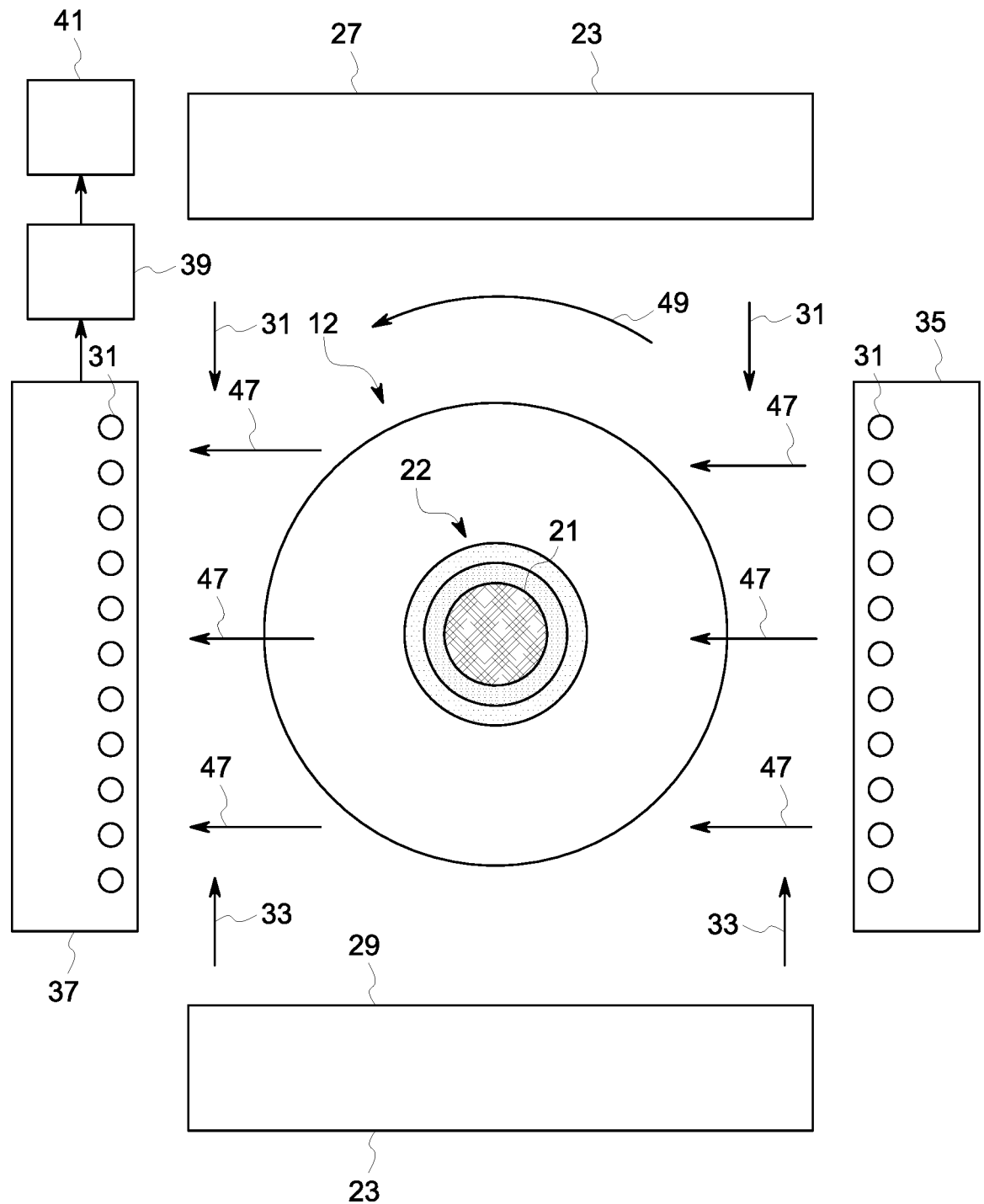
FIG. 2 is a schematic view of an exemplary build platform, recoater, and inert gas system of the additive manufacturing system shown in FIG. 1.

FIG. 2 is a schematic view of build platform 12, recoater 23, and inert gas system 25 of DMLM system 10 shown in FIG. 1. FIG. 2 shows recoater 23 in a first position 27 and a second position 29. During operations, powdered build material 21 is dispensed on component 28 and build platform 12. Recoater 23 starts at first position 27. Recoater 23 moves to second position 29 as indicated by arrows 31. While moving from first position 27 to second position 29, recoater 23 spreads powdered build material on component 28 and build platform 12. Recoater 23 moves back to first position 27 as indicated by arrows 33. While moving from second position 29 to first position 27, recoater 23 spreads powdered build material on component 28 and build platform 12. In the exemplary embodiment, build platform 12 has a circular shape. However, build platform 12 has any shape which enables DMLM system 10 to operate as described herein.

As shown in FIG. 1, laser device 14 is configured to generate a laser beam 16 of sufficient energy to at least partially melt the powdered build material 21 of build platform 12. The melting powdered build material 21 partially vaporizes, creating smoke. Smoke interferes with laser device 14. In the exemplary embodiment, laser device 14 is a yttrium-based solid state laser configured to emit a laser beam having a wavelength of about 1070 nanometers (nm). In other embodiments, laser device 14 includes any suitable type of laser that enables DMLM system 10 to function as described herein, such as a carbon dioxide laser. Further, although DMLM system 10 is shown and described as including a single laser device 14, DMLM system 10 includes more than one laser device.

Laser device 14 is optically coupled to optical elements 30 and 32 that facilitate focusing laser beam 16 on build platform 12. In the exemplary embodiment, optical elements 30 and 32 include a beam collimator 30 disposed between the laser device 14 and first scanning device 18, and an F-theta lens 32 disposed between the first scanning device 18 and build platform 12. In other embodiments, DMLM system 10 includes any suitable type and arrangement of optical elements that provide a collimated and/or focused laser beam on build platform 12.

First scanning device 18 is configured to direct laser beam 16 across selective portions of build platform 12 to create solid component 28. In the exemplary embodiment, first scanning device 18 is a galvanometer scanning device including a mirror 34 operatively coupled to a galvanometer-controlled motor 36 (broadly, an actuator). Motor 36 is configured to move (specifically, rotate) mirror 34 in response to signals received from controller 26, and thereby deflect laser beam 16 across selective portions of build platform 12. Mirror 34 has any suitable configuration that enables mirror 34 to deflect laser beam 16 towards build platform 12. In some embodiments, mirror 34 includes a reflective coating that has a reflectance spectrum that corresponds to the wavelength of laser beam 16.

Although first scanning device 18 is illustrated with a single mirror 34 and a single motor 36, first scanning device 18 includes any suitable number of mirrors and motors that enable first scanning device 18 to function as described herein. In one embodiment, for example, first scanning device 18 includes two mirrors and two galvanometer-controlled motors, each operatively coupled to one of the mirrors. In yet other embodiments, first scanning device 18 includes any suitable scanning device that enables DMLM system 10 to function as described herein, such as, for example, two-dimension (2D) scan galvanometers, three-dimension (3D) scan galvanometers, and dynamic focusing galvanometers.

In FIG. 2, inert gas system 25 includes an air knife 35, a plenum 37, a filter 39, and a blower 41. Air knife 35 includes a plurality of air knife holes 43 and plenum 37 includes a plurality of plenum holes 45. Plenum 37 is coupled in flow communication with filter 39 and blower 41. Air knife 35 is coupled to a source of inert gas (not shown). Air knife 35 channels a flow of inert gas through air knife holes 43 and across build platform 12 toward plenum 37 as indicated by arrows 47. Blower 41 draws the flow of inert gas into plenum holes 45 and plenum 37 channels the flow of inert gas to filter 39 which filters the flow of inert gas.

In FIG. 2, the flow of inert gas and recoater 23 causes defects in component 28 by dragging on powdered build material 21 and melt pool 22. These defects are amplified by the flow of inert gas flowing in the same direction and recoating in the same direction throughout the build process. In order to reduce the cumulative effect of the defects in one direction, build platform 12 is configured to rotate as indicated by arrow 49. A rotator 52 (shown in FIG. 1) is configured to rotate build platform 12. Rotator 52 includes any mechanical rotating device which enables DMLM system 10 to function as described herein. In the exemplary embodiment, build platform 12 rotates between spreading of layers of powdered build material 21. In the exemplary embodiment, build platform 12 rotates 30 degrees between spreading of layers of powdered build material 21. In another embodiment, build platform 12 rotates between 30 degrees and 180 degrees between spreading of layers of powdered build material 21. In yet another embodiment, build platform 12 rotates between 30 degrees and 60 degrees between spreading of layers of powdered build material 21. In yet another embodiment, build platform 12 rotates between 90 degrees and 180 degrees between spreading of layers of powdered build material 21. In the exemplary embodiment, build platform 12 is configured to descend while rotating. In the exemplary embodiment, build platform 12 rotates in counter-clockwise direction 49. However, build platform 12 also rotates in a clockwise direction.

Figure 3:
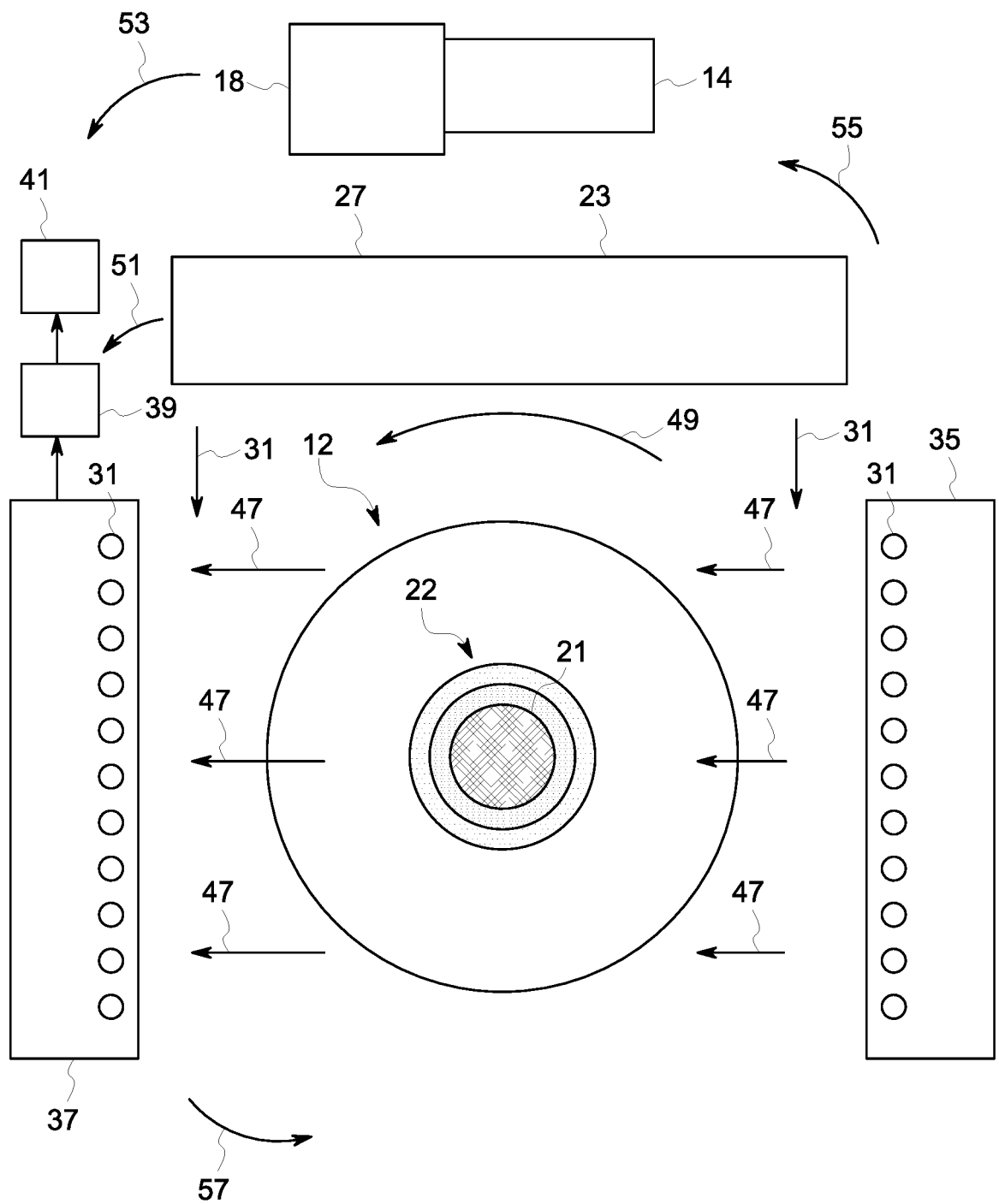
FIG. 3 is a schematic view of an exemplary build platform, recoater, and inert gas system of the additive manufacturing system shown in FIG. 1.

FIG. 3 is a schematic view of build platform 12, recoater 23, laser device 14, first scanning device 18, and inert gas system 25 of DMLM system 10 shown in FIG. 1. As shown in FIG. 3, build platform 12, recoater 23, laser device 14, first scanning device 18, air knife 35, and plenum 37 are all configured to rotate as indicated by arrows 49, 51, 53, 55, and 57 respectively. In the exemplary embodiment, build platform 12 is configured to rotate relative to recoater 23, laser device 14, first scanning device 18, air knife 35, and plenum 37. Rotation of build platform 12 relative to recoater 23, laser device 14, first scanning device 18, air knife 35, and plenum 37 between spreading layers of powdered build material 21 reduces the cumulative effect of the defects in one direction. Coupling rotating equipment together reduces the number of rotating pieces and the complexity of DMLM system 10. In another embodiment, recoater 23, laser device 14, first scanning device 18, air knife 35, and plenum 37 are coupled together and rotate while build plate 12 remains stationary.

Computing device 24 includes a computer system that includes at least one processor (not shown in FIG. 1) that executes executable instructions to operate DMLM system 10. Computing device 24 includes, for example, a calibration model of DMLM system 10 and an electronic computer build file associated with a component, such as component 28. The calibration model includes, without limitation, an expected or desired melt pool size and temperature under a given set of operating conditions (e.g., a power of laser device 14) of DMLM system 10. The build file includes build parameters that are used to control one or more components of DMLM system 10. Build parameters includes, without limitation, a power of laser device 14, a scan speed of first scanning device 18, and a position and orientation of first scanning device 18 (specifically, mirror 34). In the exemplary embodiment, computing device 24 and controller 26 are shown as separate devices. In other embodiments, computing device 24 and controller 26 are combined as a single device that operates as both computing device 24 and controller 26 as each are described herein.

In the exemplary embodiment, computing device 24 is also configured to operate at least partially as a data acquisition device and to monitor the operation of DMLM system 10 during fabrication of component 28. In one embodiment, for example, computing device 24 receives and processes electrical signals 44 from first optical detector 38. Computing device 24 store information associated with melt pool 22 based on electrical signals 44, which is used to facilitate controlling and refining a build process for DMLM system 10 or for a specific component built by DMLM system 10.

Controller 26 includes any suitable type of controller that enables DMLM system 10 to function as described herein. In one embodiment, for example, controller 26 is a computer system that includes at least one processor and at least one memory device that executes executable instructions to control the operation of DMLM system 10 based at least partially on instructions from human operators. Controller 26 includes, for example, a 3D model of component 28 to be fabricated by DMLM system 10. Executable instructions executed by controller 26 includes controlling the power output of laser device 14, controlling a position and scan speed of first scanning device 18, and controlling a position and scan speed of second scanning device 42.

Controller 26 is configured to control one or more components of DMLM system 10 based on build parameters associated with a build file stored, for example, within computing device 24. In the exemplary embodiment, controller 26 is configured to control first scanning device 18 based on a build file associated with a component to be fabricated with DMLM system 10. More specifically, controller 26 is configured to control the position, movement, and scan speed of mirror 34 using motor 36 based upon a predetermined path defined by a build file associated with component 28.

In the exemplary embodiment, controller 26 is also configured to control second scanning device 42 to direct EM radiation 40 from melt pool 22 to first optical detector 38. Controller 26 is configured to control the position, movement, and scan speed of first mirror 46 and second mirror 50 based on at least one of the position of mirror 34 of first scanning device 18 and the position of melt pool 22. In one embodiment, for example, the position of mirror 34 at a given time during the build process is determined, using computing device 24 and/or controller 26, based upon a predetermined path of a build file used to control the position of mirror 34. Controller 26 controls the position, movement, and scan speed of first mirror 46 and second mirror 50 based upon the determined position of mirror 34. In another embodiment, first scanning device 18 is configured to communicate the position of mirror 34 to controller 26 and/or computing device 24, for example, by outputting position signals to controller 26 and/or computing device 24 that correspond to the position of mirror 34. In yet another embodiment, controller 26 controls the position, movement, and scan speed of first mirror 46 and second mirror 50 based on the position of melt pool 22. The location of melt pool 22 at a given time during the build process is determined, for example, based upon the position of mirror 34.

Controller 26 is also configured to control other components of DMLM system 10, including, without limitation, laser device 14. In one embodiment, for example, controller 26 controls the power output of laser device 14 based on build parameters associated with a build file.

Embodiments of the additive manufacturing systems with a build platform described herein rotate a build platform relative to an air knife. The additive manufacturing system includes a build platform, an air knife, a laser device, a recoater, and a plenum. The laser device generates a laser beam directed to a powdered build material on the build platform. The recoater spreads the powdered build material on the build platform. The air knife channels a flow of inert gas across the build platform in order to clear smoke generated by the build process away from the laser beam. The plenum channels the flow of inert gas and the smoke away from the laser beam and the build platform. The build platform rotates relative to the air knife and the recoater between each layer of powdered build material. Thus, the defects caused by the air knife and the recoater are directed in different directions for each layer and cancel each other out.

An exemplary technical effect of the methods and systems described herein includes: (a) rotating a build plate relative to an air knife; (b) rotating a build plate relative to a recoater; (c) reducing defects in a component caused by an air knife; and (d) reducing defects in a component caused by a recoater.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems having build platforms are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system configured to manufacture a component, said additive manufacturing system comprising:
    a laser device configured to generate a laser beam;
    a build platform, the component disposed on a surface of said build platform;
    a recoater configured to coat a powdered build material on the component and said build platform;
    an air knife configured to channel a flow of inert gas across said build platform;
    a plenum configured to channel the flow of inert gas away from said build platform, said plenum configured to independently rotate relative to said build platform, said laser device, said recoater, and said air knife; and a first scanning device configured to selectively direct the laser beam across said build platform, the laser beam configured to generate successive layers of a melted powdered material on the component and said build platform, wherein said build platform configured to rotate the component relative to said air knife about an axis that is oriented perpendicular to the surface of said build platform.

2. The additive manufacturing system in accordance with claim 1 further comprising at least one wall defining an air-locked build chamber, said air knife and said build platform disposed within said air-locked build chamber.

3. The additive manufacturing system in accordance with claim 1, wherein said build platform is configured to rotate the component relative to said air knife and said laser device.

4. The additive manufacturing system in accordance with claim 1, wherein said build platform is configured to rotate the component relative to said air knife between generation of successive layers of the melted powdered material.

5. The additive manufacturing system in accordance with claim 4, wherein said build platform is configured to rotate the component in a range from and including about 30 degrees to and including about 60 degrees relative to said air knife between generation of successive layers of the melted powdered material.

6. The additive manufacturing system in accordance with claim 4, wherein said build platform is configured to rotate the component in a range from and including about 90 degrees to and including about 180 degrees relative to said air knife between generation of successive layers of the melted powdered material.

7. The additive manufacturing system in accordance with claim 1, wherein said build platform is configured to descend while rotating.

8. An additive manufacturing system configured to manufacture a component, said additive manufacturing system comprising:
a laser device configured to generate a laser beam;
a build platform, the component disposed on a surface of said build platform;
an air knife configured to channel a flow of inert gas across said build platform;
a plenum configured to channel flow of inert gas away from said build platform;
a recoater configured to coat a powdered build material on the component and said build platform;
at least one wall defining an air-locked build chamber, wherein said air knife, said recoater, and said build platform are disposed within said air-locked build chamber, and wherein said air knife, said recoater, and said build platform are configured to independently rotate relative to said air-locked build chamber; and
a first scanning device configured to selectively direct the laser beam across said build platform, the laser beam configured to generate successive layers of a melted powdered material on the component and said build platform, wherein said build platform and said recoater are configured to independently rotate relative to each other, said build platform configured to rotate about an axis oriented perpendicular to the surface of said build platform.

9. The additive manufacturing system in accordance with claim 8 further comprising a filter and a blower, said filter and said blower coupled in flow communication with said plenum, wherein said filter, said blower, and said plenum are configured to channel the flow of inert gas away from said build platform.

10. The additive manufacturing system in accordance with claim 8, wherein said plenum is configured to independently rotate relative to said build platform, said laser device, said recoater, and said air knife.

11. The additive manufacturing system in accordance with claim 8, wherein said plenum is coupled to said air knife, said plenum, and said air knife are configured to rotate relative to said build platform, said laser device, and said recoater.

12. The additive manufacturing system in accordance with claim 8, wherein said recoater is coupled to said laser device, said recoater and said laser device are configured to rotate relative to said build platform.

13. A method of manufacturing a component with an additive manufacturing system, the additive manufacturing system including a build platform, an air knife, a recoater, a plenum, and a laser device, the component disposed on a surface of the build platform, the air knife configured to channel a flow of inert gas across the build platform, the plenum configured to channel the flow of inert gas away from the build platform, said method comprising:
spreading a powdered build material on the build platform and the component with the recoater;
generating a laser beam with the laser device, the laser beam directed toward the powdered build material;
generating a layer of a melted powdered build material with the laser beam;
rotating the build platform relative to the air knife about an axis oriented perpendicular to the surface of the build platform; and
independently rotating the plenum relative to the build platform, the laser device, the recoater, and the air knife.

14. The method of claim 13 further comprising rotating the recoater relative to the build platform.

15. The method of claim 13, wherein rotating the build platform relative to the air knife comprises rotating the build platform in a range from and including about 30 degrees to and including about 60 degrees relative to the air knife.

16. The method of claim 13, wherein rotating the build platform relative to the air knife comprises rotating the build platform in a range from and including about 90 degrees to and including about 180 degrees relative to the air knife.

17. The method of claim 13 further comprising rotating the laser device relative to the build platform.

* * * * *